United States Patent
Bohner et al.

(10) Patent No.: US 6,273,468 B1
(45) Date of Patent: Aug. 14, 2001

(54) STEERING SYSTEM

(75) Inventors: Hubert Bohner, Boeblingen; Wolfgang Schuliers, Buchholz, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/484,423

(22) Filed: Jan. 18, 2000

(30) Foreign Application Priority Data

Jan. 15, 1999 (DE) ............................................. 199 01 300

(51) Int. Cl.$^7$ ........................................................ B62D 1/18
(52) U.S. Cl. ................................................................ 280/775
(58) Field of Search .................................... 280/775, 777; 180/402, 403, 400

(56) References Cited

U.S. PATENT DOCUMENTS 4,833,936 * 5/1989 Mariani et al. .
5,722,300 * 3/1998 Burkhard et al. .
6,138,788 * 10/2000 Bohner et al. .

FOREIGN PATENT DOCUMENTS

4103548C1 4/1992 (DE) .
19625503C1 10/1997 (DE) .

* cited by examiner

*Primary Examiner*—Kevin Hurley
(74) *Attorney, Agent, or Firm*—Crowell & Moring, L.L.P.

(57) ABSTRACT

A steering system has a steering wheel and steered vehicle wheels which are normally connected only controlwise by a control system, with the steering wheel actuating a steering angle setpoint generator and with the steered vehicle wheels adjusting a steering angle actual value generator so that the control system can actuate a motorized steering control assembly in accordance with a setpoint-actual value comparison of the steering angle during control of the steered vehicle wheels by steering. Axial displaceability of the steering wheel is provided so that stable mounting prevents vibrations of the steering wheel and the feedback effects on the steering angle setpoint generator originating therefrom.

21 Claims, 2 Drawing Sheets

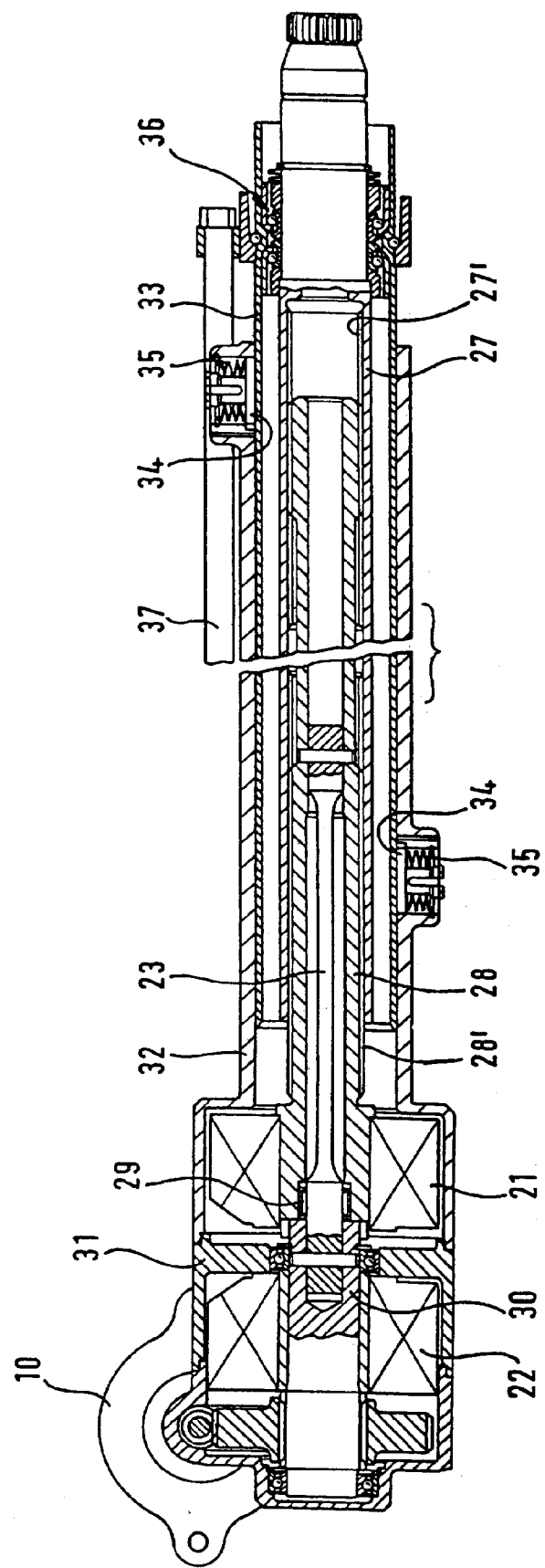

STEERING SYSTEM

BACKGROUND AND SUMMARY OF THE INVENTION

This application claims the priority of German application 199 01 300.4, filed in Germany on Jan. 15, 1999, the disclosure of which is expressly incorporated by reference herein.

The invention relates to a steering system provided for motor vehicles with a steering wheel that can be operated on the driver's side, a steering control assembly for motorized steering control of steered vehicle wheels, a steering angle setpoint generator operated by the steering wheel, a steering angle actual value sensor actuated by the steered vehicle wheels, a control system which actuates the steering control assembly as a function of a setpoint-actual value comparison of the steering angle, a manual force control device that exerts a restoring force on the steering handle, in correlation with the forces that develop between the steered vehicle wheels and the steering control assembly, as well as a control travel of the steering handle correlated with the changes in the steering angles of the steered vehicle wheels.

Steering systems of the type described above are being developed at the current time. In other words, the "steer by wire" concept is being implemented in contrast to conventional steering systems, no forced coupling is provided during normal operation between the steering handle or steering wheel and the steered vehicle wheels; instead, the steered vehicle wheels and the steering handle are coupled effectwise with one another by only a control system. A manual force control device serves to generate a steering resistance in the steering handle or steering wheel and to adjust the steering handle or steering wheel similarly to the steered vehicle wheels on the basis of steering movements produced by disturbing forces. Therefore, the manual force control device produces a feedback of the steering forces acting on the steered wheels as well as the steering movements of these wheels to the steering handle or steering wheel.

In the event of a problem with the control system or system parts cooperating therewith, a hydraulic or mechanical emergency system is provided which automatically becomes effective if a problem occurs, with the result that a hydraulic or, as in previous steering systems, a mechanical forced coupling is created between the steering handle and the steered vehicle wheels.

A goal of the invention is to provide an advantageous design for an axially adjustable steering wheel in a steering system of the type recited at the outset.

This goal is achieved according to the invention by virtue of the fact that the manual force control device is connected drivewise with the steering wheel by an axially stationary shaft part which is connected axially displaceably and nonrotatably with another shaft part mounted axially and radially in a jacket tube at its end facing the steering wheel and that the jacket tube is guided axially displaceably in a relatively stationary housing part and is held without play by spring clamping.

The invention is based on the general idea to provide a housing that receives at least the parts of the shaft train on the steering wheel side for a shaft train that is axially adjustable and permits axial control of the steering wheel between the steering wheel and the manual force control device, said housing participating in the axial control of the shaft train and thus supporting a part of the shaft train axially and radially on the steering wheel side at a constant distance from the steering wheel, said support having a high degree of resistance to vibration because the housing parts that are adjustable relative to one another are held relative to one another without play by spring clamping.

The invention takes into account the fact that on the one hand, axial adjustability of the steering wheel is desirable for reasons of comfort, and on the other hand vibrations or oscillations of the steering wheel can be avoided with particularly high reliability in a steering system of the type described at the outset since these oscillations and vibrations can result in corresponding fluctuations in the steering angle setpoint signals from the steering angle setpoint generator actuated by the steering wheel. This would be associated with corresponding control of the steering control assembly, with the consequence that the steering control assembly would attempt to follow the constant changes in the steering angle setpoint and could even amplify the vibrations and oscillations of the steering wheel. This is avoided in the invention.

According to a preferred embodiment of the invention, provision is made for the housing to have a guide tube integral with the housing for the jacket tube and for the guide tube to have radial recesses spaced axially apart for flexible pressure bodies which clamp the jacket tube radially in the guide tube.

In an especially advantageous embodiment of the invention, preferably two pressure bodies and recesses are provided that are spaced axially apart from one another, are offset with respect to one another in the circumferential direction of the guide tube, and in particular are opposite one another diametrically in the axial view of the guide tube.

This design ensures that even when manufacturing tolerances are high, there is an extraordinarily strong connection between the guide and jacket tubes; for this purpose, it is merely necessary to make the spring forces for the pressure bodies sufficiently powerful. In particular, it is advantageous that wobbling movements of the jacket tube in the guide tube are reliably suppressed by the above arrangement of pressure bodies.

It is also advantageous for the manual force control device to be connected with the steering wheel by a rotating rod which connects an axially stationary first shaft part with an axially stationary second shaft part which is axially displaceably and nonrotatably connected with the other shaft part, with the second shaft part being made tubular and the rotating rod being located essentially inside this shaft part and with the end of the second shaft part facing the first shaft part being mounted radially on an end piece of the rotating rod that is connected with the first shaft part and the other end of the second shaft part being connected nonrotatably and permanently with the other end of the rotating rod.

Here, the rotating rod also serves to connect the ends of the first and second shaft parts facing one another radially immovably relative to one another, with the first shaft part additionally possibly being connected radially to a stationary housing.

In addition, reference is made regarding the preferred invention embodiments to the claims as well as the following explanation of the invention on the basis of the especially preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 2 shows an axial section through an axially adjustable steering shaft constructed according to preferred embodiments of the invention.

DETAILED DESCRIPTION OF THE DRAWINGS

Figure 1:
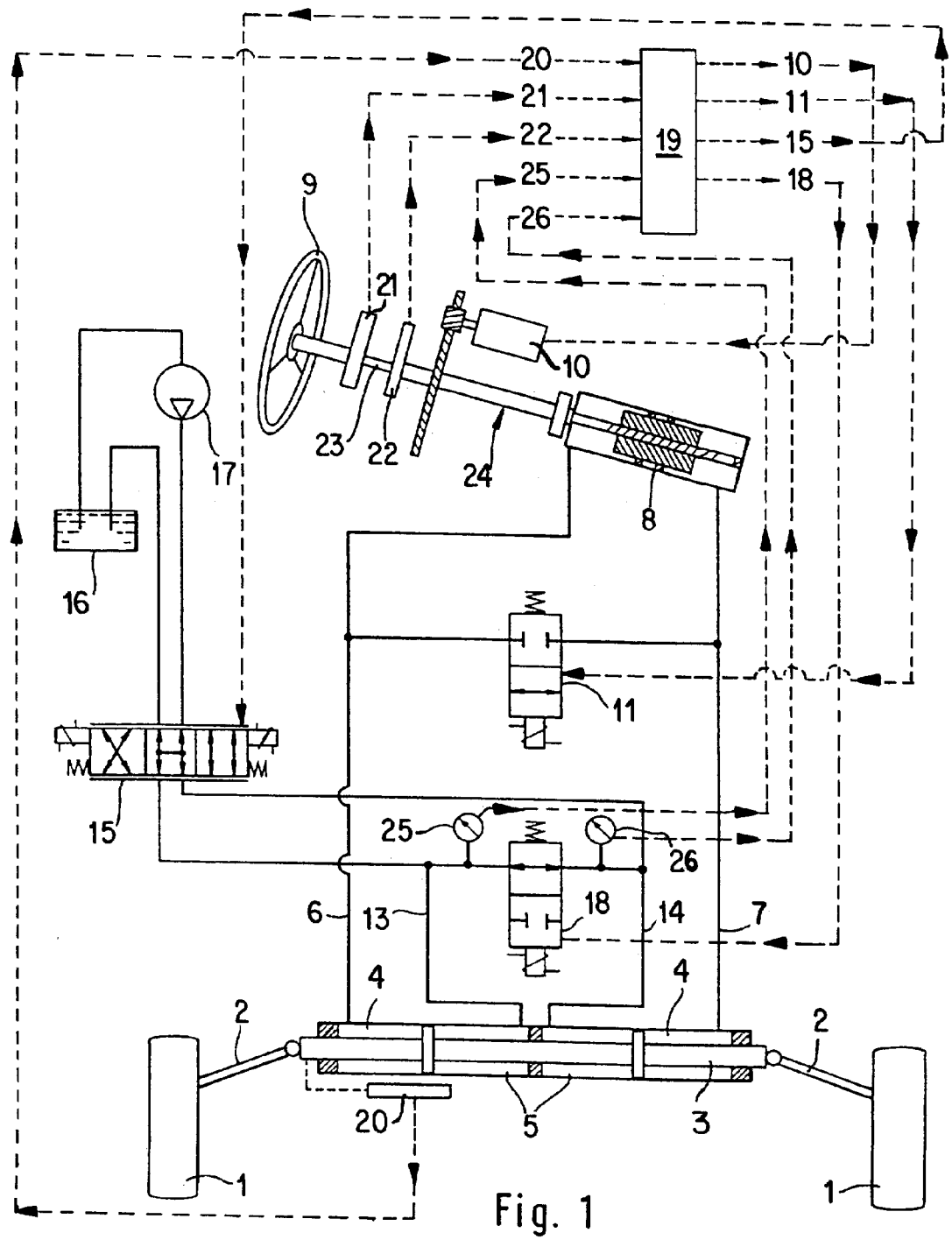
FIG. 1 shows a simplified view of a steering system in the form of a diagram, constructed according to preferred embodiments of the invention.

According to FIG. 1, a motor vehicle, not shown in greater detail, has steerable front wheels 1 coupled with one another in a steerable fashion by tie rods 2 as well as a rod 3. Rod 3 forms the piston rod of two piston cylinder assemblies 4 and 5 arranged parallel to one another, each of which is designed as a double-acting assembly, with the two chambers of piston-cylinder assembly 4 being arranged on either side of the chambers of piston-cylinder assembly 5 located therebetween.

The piston-cylinder assembly 4 is connected by two hydraulic lines 6 and 7 with the two piston working chambers of a double-acting piston-cylinder assembly 8 whose piston is connected mechanically drivewise with a steering wheel 9. The piston of assembly 8 therefore is displaced rightward and leftward in FIG. 1 when steering wheel 9 is turned clockwise or counterclockwise. When the piston of assembly 8 is displaced, steering wheel 9 is rotated accordingly.

In addition, steering wheel 9 is connected drivewise with an electric motor 10 that is free of self-locking, said motor being able to operate as a pure power generator when the motor shaft is held firmly and whose purpose is explained below.

Between hydraulic lines 6 and 7, a normally closed shutoff valve arrangement 11 is located which can be switched to its open position against the force of a restoring spring by energizing its control magnet. As soon as the power to the control magnet is cut off, shutoff valve arrangement 11 is returned by its restoring spring to the closed position shown and is held in this position.

Piston-cylinder assembly 5 is connected by hydraulic lines 13 and 14 with two connections of a control valve 15 which is connected by two additional connections with a relatively zero-pressure hydraulic reservoir 16 and a hydraulic pressure source which in the example shown is a pump 17 connected on the intake side to hydraulic reservoir 16. Pump 17 is driven by an electric motor, not shown, and/or the engine of the motor vehicle, likewise not shown.

Between hydraulic lines 13 and 14, a normally open shutoff valve 18 is located which can be moved against the force of a restoring spring from the open position shown into its closed position or can be held in this closed position by electrical energization of its control magnet.

An electronic regulating and control arrangement 19 is connected on the input side with a generator 20 for the actual value of the steering angle of front wheels 1. This generator 20 for example can cooperate with rod 3 which, during the steering control of wheels 1, executes a control travel similar to the actual value of the steering angle.

In addition, the input side of regulating and control arrangement 19 is connected with a generator 21, actuated by steering wheel 9, for the setpoint of the steering angle. This setpoint generator 21 operates using the principle of a rotational angle generator, in other words its signals are correlated with the respective rotational positions of steering wheel 9 or the steering shaft part between steering wheel 9 and setpoint generator 21.

In addition, regulating and control arrangement 19 is connected with a rotational angle generator 22 which is connected rotationally elastically drivewise with setpoint generator 21 by a rotating rod 23. This rotating rod 23 therefore forms a rotationally elastic part of the steering shaft arrangement 24 which is otherwise torsionally strong From the signals of setpoint generator 21 and rotational angle generator 22, the relative twist between setpoint generator 21 and rotational angle generator 22 and hence the degree of twisting of rotating rod 23 can be determined. This is equivalent to saying that regulating and control arrangement 19 can detect the manual force on steering wheel 9 from the signals of generators 21 and 22.

The steering system in FIG. 1 normally functions as follows:

During normal operation, the shutoff valve arrangement 11 and shutoff valve 18 are moved into the positions not shown and held in these positions by energizing the corresponding control magnets. Accordingly, piston-cylinder assembly 4 is decoupled hydraulically from piston-cylinder assembly 8 and from steering wheel 9.

Between the two piston working chambers of piston-cylinder assembly 5, a pressure differential is controlled as follows by actuating control valve 15:

Control and regulating arrangement 19 determines the actual value of the steering angle of front wheels 1 through generator 20. The setpoint of the steering angle is specified through generator 21 actuated by the steering wheel. The control magnets of control valve 15 are then controlled following a comparison of the setpoint and actual value performed by regulating and control arrangement 19, When there is no difference between the setpoint and actual value, control valve 15 remains in the middle position shown in which piston-cylinder assembly 5 is switched hydraulically to freewheel and connected with reservoir 16. If a difference develops between the setpoint and actual value, control valve 15 is displaced rightward or leftward from the middle position shown depending of the direction of the deviation between setpoint and actual value so that in each case a piston working chamber of piston-cylinder assembly 5 is controllably connected with the pressure connection of control valve 15 and the other piston working chamber of assembly 5 is connected with reservoir 16 so that a controllable pressure differential exists in the piston-cylinder assembly 5 with the result that piston-cylinder assembly 5 produces a control force in a direction specified by the direction of the difference between the setpoint and actual value of the steering angle. In this manner, a difference between the setpoint and actual value of the steering angle is corrected in short order and front wheels 1 follow the steering control of steering wheel 9.

From signals from pressure sensors 25 and 26 which detect pressures in lines 13 and 14 and/or from the electrical voltages and current strengths in the control magnets of control valve 15, regulating and control arrangement 19 can determine directly or indirectly the pressure differential acting on piston-cylinder assembly 5. The degree of this pressure differential is correlated with the forces or moments transmitted between steerable front wheels 1 and piston-cylinder assembly 5. In correlation with these forces and moments, a setpoint is determined by regulating and control arrangement 19 for a manual force that can be felt in steering wheel 9 and adjusted by corresponding control of electric motor 10, so that the actual value of the manual forces is determined from the signals from generators 21 and 22. As a result, motor 10 is regulated for manual forces as a function of a comparison of the setpoint and actual value. In this manner, the driver receives a haptic feedback at steering wheel 9 of the forces operating between steered vehicle wheels 1 and piston-cylinder assembly 5. If a steering adjustment of steerable wheels 1 is produced by these forces, steering wheel 9 will be adjusted in a corresponding fashion by electric motor 10.

Regulating and control arrangement 19 constantly monitors correct function. If a problem develops, the system operates as follows:

In such cases, the control magnet of shutoff valve arrangement 11 is de-energized with the result that the shutoff valve arrangement switches to the closed position shown in FIG. 1 and piston-cylinder assemblies 4 and 8 and hence steerable front wheels 1 and steering wheel 9 are forcibly coupled hydraulically with one another.

As soon as a sufficient residual function of regulating and control system 19 and the sensing system cooperating therewith is achieved, the steering system according to the invention operates with forced coupling engaged between steering wheel 9 and steered front wheels 1 as in a conventional power steering system. This means that regulating and control arrangement 19 controls control valve 15 as a function of the forces and moments transmitted between steering wheel 9 and steered vehicle wheels 1 in such fashion that piston-cylinder assembly 5 generates a servo force that reduces the manual force applied to steering wheel 9. The forces and moments transmitted between steering wheel 9 and steered vehicle wheels 1 can be determined from the signals of generators 21 and 22 which detect the twisting of rotating rod 23 produced by the above forces and moments.

If emergency operation similar to conventional power steering is not possible, the power to the electromagnet in shutoff valve 18 is cut off so that shutoff valve 18 assumes its open position shown in FIG. 1 and piston-cylinder assembly 5 is switched hydraulically to freewheel regardless of the position of control valve 15.

According to FIG. 2, steering shaft arrangement 24 has a first steering shaft part 27 whose end at the right in FIG. 2 supports steering wheel 9, not shown in FIG. 2, or is connected therewith. Steering shaft part 27 is designed as a hollow shaft and provided with axial internal teeth 27' in which a second steering shaft part 28 with matching axial external teeth 28' is located axially displaceably.

Steering shaft part 28 is likewise designed as a hollow shaft and accepts in its interior, rotating rod 23 which is mounted by its right-hand end piece in FIG. 2 nonrotatably in a middle area of steering shaft part 28.

The left-hand end of rotating rod 23 in FIG. 2 is mounted radially inside the left end of second shaft part 28 by means of a needle bearing 29. An end portion of rotating rod 23 projecting from the left end of second shaft part 28 is permanently connected to a third shaft part 30; this connection can be made in the same way as the connection between the rotating rod and second shaft part 28. As a result of the radial mounting of rotating rod 23 in the left end of second shaft part 28 as well as a radially fixed bearing between shaft part 30 and a stationary housing part 31, assurance is provided that shaft parts 28 and 30 are radially immovable relative to one another.

A part of the steering angle setpoint generator 21 that rotates together with shaft part 28 is located nonrotatably on the outer circumference of the left end of second shaft part 28. The facing end of third shaft part 30 accordingly supports the part of rotational angle generator 22 that rotates with shaft part 30.

Generators 21 and 22 are accommodated jointly in housing 31 which extends rightward in a guide tube 32 in FIG. 2. This guide tube 32 receives a jacket tube 33 in an axially displaceable manner. This tube is secured inside guide tube 32 by two pressure bodies 34 which are displaceably guided in radial bushing parts of guide tube 32 and are pressed against the outside circumferential wall of jacket tube 33 by cup spring packets 35. The pressure bodies 34 are spaced far apart in the axial direction of guide tube 32. In an axial view of guide tube 32, pressure bodies 34 are located diametrically opposite one another. Pressure bodies 34 can also be offset with respect to one another in the circumferential direction of guide tube 32 so that each pressure body lies with its central axis in a separate axial plane of guide tube 32.

As a result of this arrangement of pressure bodies 34, even with large manufacturing tolerances, in other words when the inside diameter of guide tube 32 is larger than the outside diameter of jacket tube 33, an especially firm mounting of jacket tube 33 is ensured.

The first shaft part 27 is mounted firmly axially and radially inside the right-hand end of jacket tube 33, for example by deep-groove ball bearings 36.

Between guide tube 32 and jacket tube 33, an adjusting drive not shown in greater detail is provided by which jacket tube 33 can be displaced axially relative to guide tube 32 by overcoming the retaining forces produced by pressure bodies 34. This adjusting drive displaces a rod 37 whose right-hand end in FIG. 2 is fastened to a sleeve permanently connected with jacket tube 33.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering system for motor vehicles comprising:
    a steering wheel that can be operated by the driver,
    a steering assembly for using a motor to adjust the steering of steered vehicle wheels,
    a steering angle setpoint generator actuated by the steering wheel,
    a steering angle actual value generator actuated by the steered vehicle wheels,
    a control system that operates the steering assembly as a function of a comparison of the setpoint and actual value of the steering angle, and
    a manual force control device which, in correlation with forces that develop between the steered vehicle wheels and the steering assembly, produces a restoring force on the steering handle as well as a control travel of the steering handle correlated with changes in the steering angle of the steered vehicle wheels,
    wherein the manual force controller is connected drivewise with the steering wheel by an axially stationary shaft part, said part being axially displaceably and nonrotatably connected with another shaft part that is mounted axially and radially in a jacket tube at an end facing the steering wheel and is axially displaceably guided in the jacket tube in a relatively stationary housing part and is held with substantially zero play by spring clamping of said jacket tube.

2. Steering system according to claim 1, wherein a housing for the steering angle setpoint generator and the steering angle actual valve generator is located in an axially fixed position in a console or dash panel of the vehicle.

3. Steering system according to claim 1, wherein the housing has a guide tube, integral with the housing, for the jacket tube.

4. Steering system according to claim 3, wherein the guide tube has radial recesses to receive flexible pressure bodies spaced axially from one another, said bodies clamping the jacket tube radially in the guide tube.

5. Steering system according to claim 4, wherein two of the pressure bodies or recesses are spaced axially from one another and offset with respect to one another in the circumferential direction of the guide tube.

6. Steering system according to claim 5, wherein the pressure bodies or recesses are located diametrically opposite one another.

7. Steering system according to claim 1, wherein the manual force control device is rotationally elastically connected with the steering wheel by a rotating rod which connects an axially stationary first shaft part with an axially stationary second shaft part which is connected axially displaceably and nonrotatably with another shaft part, and wherein the second shaft part is made tubular, and the rotating rod is located essentially inside this second shaft part with the end of the second shaft part facing the first shaft part being radially mounted on an end piece of the rotating rod that is connected with the first shaft part and the other end of the second shaft part is connected nonrotatably and/or permanently with the other end of the rotating rod.

8. Steering system according to claim 7, wherein the end of the second shaft part facing the first shaft part supports a first angle sensor and the facing end of the first shaft part supports a second angle sensor.

9. Steering system according to claim 8, wherein signals from the first angle sensor for specifying a steering angle setpoint and signals of the second angle sensor are evaluated to determine the manual force generated by the manual force controller.

10. Steering system according to claim 9, wherein rotational vibrational damping is operative or provided between the first and the second shaft parts.

11. Steering system according to claim 10, wherein the first shaft part is located near a radial bearing at the end of the second shaft part facing the first shaft part and is located axially between the first and second angle sensors, radially on the stationary housing part.

12. Steering system according to claim 7, wherein a housing for the steering angle setpoint generator and the steering angle actual valve generator is located in an axially fixed position in a console or dash panel of the vehicle.

13. Steering system according to claim 12, wherein the housing has a guide tube, integral with the housing, for the jacket tube.

14. Steering system according to claim 13, wherein the guide tube has radial recesses to receive flexible pressure bodies spaced axially from one another, said bodies clamping the jacket tube radially in the guide tube.

15. Steering system according to claim 14, wherein two of the pressure bodies or recesses are spaced axially from one another and offset with respect to one another in the circumferential direction of the guide tube.

16. Steering system according to claim 15, wherein the pressure bodies or recesses are located diametrically opposite one another.

17. Steering system according to claim 16, wherein the end of the second shaft part facing the first shaft part supports a first angle sensor and the facing end of the first shaft part supports a second angle sensor.

18. Steering system according to claim 17, wherein signals from the first angle sensor for specifying a steering angle setpoint and signals of the second angle sensor are evaluated to determine the manual force generated by the manual force controller.

19. Steering system according to claim 18, wherein rotational vibrational damping is operative or provided between the first and the second shaft parts.

20. Steering system according to claim 19, wherein the first shaft part is located near a radial bearing at the end of the second shaft part facing the first shaft part and is located axially between the first and second angle sensors, radially on the stationary housing part.

21. A steering system assembly comprising:

a steering wheel, a hydroelectric control system operable to control steered vehicle wheels, and a manual force controller operable to provide steering control forces to the steering wheel, wherein the manual force controller is connected drivewise with the steering wheel by an axially stationary shaft part, said part being axially displaceably and nonrotatably connected with another shaft part that is mounted axially and radially in a jacket tube at its end facing the steering wheel and is axially displaceably guided in the jacket tube in a relatively stationary housing part and is held with substantially zero play by spring clamping on said jacket tube.

* * * * *